Figure 1:
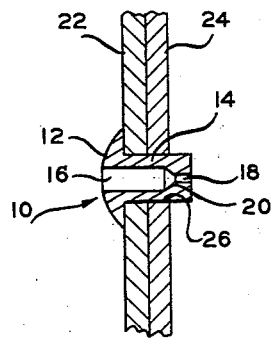

April 28, 1964     C. V. CHURCH     3,130,629

TUBULAR EXPANDABLE RIVET AND EXPANDER

Filed Nov. 7, 1960

INVENTOR.
CYRIL V. CHURCH

BY *J. Frank Church*

ATTORNEY

United States Patent Office
3,130,629
Patented Apr. 28, 1964

3,130,629
TUBULAR EXPANDABLE RIVET AND EXPANDER
Cyril V. Church, 817 Congress Ave., Pacific Grove, Calif.
Filed Nov. 7, 1960, Ser. No. 67,536
3 Claims. (Cl. 85—40)

This invention relates to an improved expandable rivet and to an expanding tool or pin for setting same in the work, particularly in "blind" riveting.

In riveting two or more pieces of work together where the form and work conditions do not allow access to one side of the work, blind riveting is resorted to. Various methods and means have been devised for forming a head on the inner end of a tubular rivet in blind riveting. There are several problems to be overcome, viz., (1) forming a head on the inner "blind" end of the rivet of sufficient strength to hold the work properly, (2) preventing radial separation of the metal in the formed head, (3) effecting a compression force between the preformed head and the blind head of the rivet, and (4) expanding the shank or stem of the rivet within the work opening or hole.

The ensuing disclosure will be made in reference to a rivet having a stem 0.250" O.D., unless other specific sizes are designated and the rivet is formed of 17 ST aluminum or other metal of similar expandable qualities.

It is highly desirable to expand the stem of the rivet in the work opening in order to provide adequate strength in the riveted work. It is necessary to have an expansion of at least 0.010" of the rivet bore in blind riveting where the work is subjected to severe strain, as is the case in aircraft construction. It is much better to have an expansion of 0.020" or 0.025". Up to this time, there has been no means or method of blind riveting whereby the rivet could be inserted and driven from the accessible side of the work to form a strong continuous annular head on the blind end of the rivet and to simultaneously expand the stem of the rivet as much as 0.010" to 0.030" against the work opening. This invention provides such a means and method.

It is, accordingly, an object of the invention to provide an improved tubular rivet and a setting and expanding pin or tool for blind riveting. Another object is to provide a tubular rivet and pin combination which permits blind riveting with insertion of and setting of the rivet from the accessible side of the work pieces and which allows adequate expansion of the stem of the rivet (up to 0.025 or 0.030") against the work opening and forms a continuous well expanded annular head on the blind end of the rivet. A further object is to provide a setting and expanding tool or pin for a tubular rivet of unique shape and effectiveness. It is also an object of the invention to provide a setting and expanding element for a tubular rivet which can be left in the bore of the rivet, integrated therewith or which can be withdrawn for reuse as a setting and expanding tool. Other objects will become apparent to one skilled in the art upon consideration of the accompanying disclosure.

One embodiment of the invention comprises the combination of a tubular rivet, having a preformed head on one end, adapted to be inserted in a hole in the work of a diameter substantially that of the external diameter of the stem of the rivet, with a setting and expanding pin or tool capable of greatly expanding said stem in said hole (up to 0.030") and forming a head on the blind end of the rivet circumferentially continuous around the nose of the pin. The rivet has an axial cylindrical bore extending from the head end to near the opposite (blind) end where it tapers to a substantially smaller bore continuing thru the rivet. The setting and expanding pin or tool comprises a main body section in the form of an elongated cylinder larger than the bore of the rivet, a pointed nose section of generally conical contour, and an intermediate transition section tapering or converging from the cylindrical body section to the nose section.

It is essential to adequate expansion of the stem of the rivet for work subjected to high stress to construct the pin or tool of a diameter at least 0.010" larger than the diameter of the stem of the rivet. With a pin of the shape disclosed herein, the diameter of the body of the pin can be as much as 0.025" or 0.030" larger than the main bore of the stem and the pin or tool can be driven so as to effect the required expansion of the stem against the hole wall in the work with formation of a circumferentially continuous head on the blind end of the rivet. In other applications involving less stress, an expansion of 0.005" to 0.010" is sufficient to provide adequate strength.

Another embodiment of the invention lies in the construction of the setting and expansion pin or tool. The conical pointed nose of this device guides the pin or tool thru the bore of the rivet. The following tapered section effects the initial expansion of the bore and stem against the work opening. This initial expansion is progressively increased until the main body section of the pin enters the bore of the rivet. In this way, the pin effects gradual and progressive expansion of the bore and stem as the nose of the pin passes all the way thru the bore. This feature of the device is essential to successful expansion of the rivet in the range of 0.010" to 0.030".

The nose section performs an additional function when the pin approaches the blind end of the rivet and enters the small bore thereof. The long taper of the nose functions in this small bore in much the same manner as the tapered section behind the nose gradually and progressively expands the main bore and stem. Here the blind end of the rivet is being expanded even more than the main bore in order to form a head on the rivet with adequate upset, but without radial partition of the expanded blind end or head.

Figure 2:
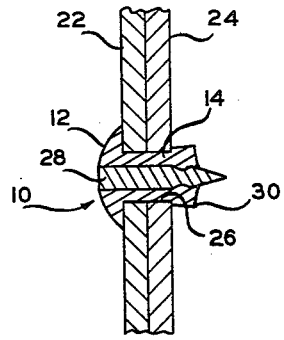
Figure 3:
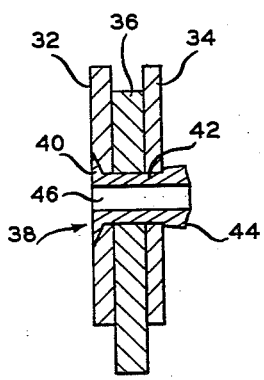
Figure 4:
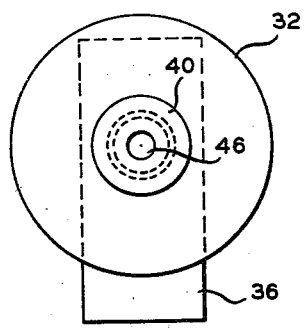
Figure 5:
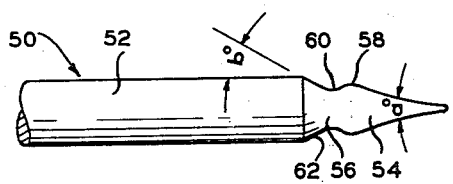

A more complete understanding of the invention may be had by reference to the accompanying drawing of which: FIGURE 1 is a fragmentary cross section of the tubular rivet positioned within the work opening before insertion and driving of the expander pin or tool; FIGURE 2 is a similar view with the expander and setting pin driven; FIGURE 3 is a cross section of the rivet in the work after setting or expanding and withdrawal of the setting tool; FIGURE 4 is a plan view of the rivet and work shown in FIGURE 3; and FIGURE 5 is a fragmentary view of the setting tool or pin.

Referring to FIGURE 1, rivet 10 comprises a preformed head 12 and a tubular stem 14 thru which the main bore 16 passes axially to bore 18 at the blind end of the rivet. A tapered or reducing bore section 20 connects the main bore 16 with the reduced bore 18. The work pieces, designated 22 and 24, are penetrated perpendicularly by drilled hole 26 having a diameter substantially that of stem 14. Stem 14 protrudes beyond the inner face of the work approximately one-half of the diameter of the stem so as to allow formation of an adequately strong head thereon.

Tapered section 20 should be positioned in the rivet so that expansion of the stem end of the rivet to form the head 30 commences just within the work opening. Section 20 is positioned so that the plane of the inner work face around the work opening passes thru this section. With section 20 positioned farther inside of the work opening, too much stress is applied to the metal in the area of expansion adjacent the work side of the expanded head; and with this section positioned nearer the blind end of the rivet, the compression of expanded head against the inside of the work is less than desired.

The angle of taper of section 20 with the bore axis should be in the range of about 25° to 60° for best results, an angle of about 35° to 45° being preferred. The diameter of bore 18 should be in the range of about ⅓ to ½ of the diameter of the main bore 16 for best results in properly forming expanded head 30.

In FIGURE 2, pin 28 is shown driven to expand stem 14 within hole 26 and also to expand the blind end of the stem to form head 30. In this embodiment of the invention pin 28 is proportioned as to length so as to effect the proper expansion of the stem and formation of the head when the pin is driven flush with the preformed head 12 and is to be left in the rivet.

FIGURES 3 and 4 show an embodiment of the invention wherein a pair of metal discs 32 and 34 are clamped firmly to an intervening metal strip 36 by rivet 38. The rivet comprises a countersunk head 40, a tubular stem 42, and an expanded head 44 on the blind end thereof. Rivet 42 has been set by a tool which was withdrawn from the bore 46 of the rivet after setting same. Rivet 38 was originally of the same construction and form as rivet 10 of FIGURE 1 and was set by a tool having the shape and proportions of FIGURE 5. (Actually, the head 40 was of the same shape as head 12 but a countersunk head is shown to illustrate same.)

The tool of FIGURE 5 is identical in shape and proportions to the pin of FIGURE 2, except that it is longer so that it may readily be driven to expand the bore of the rivet to a uniform diameter corresponding to the diameter of the main body of the pin or tool. Tool 50 has a main body section 52 and a pointed nose section 54 of substantially conical form joined to the body section 52 by a transition section 56 which converges from said body section to said nose section. The base of the nose section at 58 is substantially of the same diameter as the bore of the rivet in which it is to function. The diameter of section 56 at 60 is preferably slightly smaller than the diameter at 58 but it may be the same as the diameter at 58. Body section 52, as indicated before, is, preferably, at least 0.010″ larger than the rivet bore and up to 0.030″ larger.

The surface of the nose is preferably slightly cupped or concave, instead of being a true cone. It may also be a true cone, but it operates to advantage, when slightly concave, in effecting formation of the head without inducing radial separation thereof.

For best functioning of the pin or tool without separating or cracking the annular head of the rivet, nose section 54 is proportioned to form an angle ($a°$) in the range of about 20 to 40°, preferably, about 30°. This angle is significant in properly expanding the small bore of the stem to form the head with minimum power and without separating the annular head into segments. It is desirable to round or blend the base of the nose into the transition section 56 as shown in the drawing.

Section 56 is proportioned to form an angle ($b°$) in the range of about 25° to 45°, preferably, about 30°. This assures a general slope of surface 62 to permit maximum expansion of the stem of the rivet in the work opening without requiring excessive power and without excessive forward displacement of metal adjacent the main bore of the rivet.

FIGURES 1 to 4 of the drawing illustrate actual work pieces secured by standard rivets made and set in accordance with the invention. Rivets 10 and 38 were made of 17 ST aluminum and pin 28 was made of 24 ST aluminum. The stems of the rivets were ⅜″ in length and 0.250″ O.D. and the bores were 0.125″ in diameter drilled with a 60° lathe center. The setting pin was 0.150″ in diameter to give an expansion of the bore and stem of about 0.025″. The blind end of the rivet extended beyond the inner face of the work about 0.125″ and was expanded about 0.060″ to form a head about 0.310″ in diameter. The exposed end face of the expanded rivet head was visibly convex and protruded slightly farther than the original stem. There was no radial splitting of the heads in either instance.

The nose section of the pin was generally conical with an apex angle of about 30°. The slope of the transition section behind the nose section was about 30° and the minimum diameter of the pin just back of the nose section was about 0.005″ less than the diameter of the base of the nose section. This minimum diameter may be varied from the same as the diameter of the base of the nose section to about 0.012″ less; however, it is preferable to provide a small amount of decrease in the diameter in this range at this locus. This minimum diameter for all size pins is about 0.90 of the maximum diameter of the nose.

The setting tool used in setting rivet 38 was withdrawn after setting to leave an expanded stem and a well formed, circumferentially-continuous annular head on the inside of the work. The bore was left smooth, uniform, and of expanded diameter substantially 0.150″. This clearly demonstrates the feasibility of setting the rivets with a power operated ram, such as a compressed air hammer, provided with a setting pin of the structure of FIGURE 5 of the drawing.

In applications where the pin is to be left in the bore, a similar air operated driver or other type of power tool may be used. However, the pin may be conveniently set by driving the same with an ordinary hammer. This simple method was used in setting the pin in the rivet illustrated in FIGURE 2.

The foregoing discussion has been directed to a rivet having a stem 0.250″ in diameter. The values given are proportionately applicable to rivets of larger and of smaller sizes. To illustrate, a stem of 0.375″ diameter (⅜″) having a bore of 0.1875″ utilizes a pin of a diameter in the range of 0.015″ to 0.045″, larger than the bore; a stem of 0.1875″ diameter (³⁄₁₆″) having a bore 0.0937″ utilizes a pin of a diameter in the range of about 0.008″ to 0.023″ larger than the bore; and a rivet of 0.125 diameter (⅛″) having a bore of 0.0625″ utilizes a pin of a diameter 0.005″ to 0.015″ larger than the bore. This means that the pin for any given rivet bore is in the range of 1.08 to 1.24 times as large as the bore of the rivet in order to provide the desired expansion.

The rivet is preferably formed of 17 ST aluminum, and the pin of harder metal, such as 24 ST aluminum, steel, Monel, etc.; however, the rivet may be formed of other metals and alloys which have the necessary plasticity, tensil, etc., to permit adequate expansion to form the upset head without radial separation. The most common application of the rivet of the invention is in aircraft construction utilizing aluminum as the metal in the rivet and in the pin.

A common and frequent application of blind rivets is in thin or unsupported sheets where they must be set without distorting the work. Such a rivet, in this application, must have a good expansion factor of at least 0.010″ or 0.012″. In order to set the rivet of this invention in thin sheets or unsupported work, a high velocity driver or gun must be used, one which strikes at a velocity of about 1500 to 2000 ft. per second or more. The gun may be operated by compressed gas, electrically, magnetically, or by a compressed spring.

The design or structure of the expanding or setting pin or tool is particularly significant when functioning to expand the rivet in thin sheets or unsupported work. The pin of the invention moves the shell outwardly with a minimum of longitudinal stress. This is controlled by the long taper of the point or nose section of the pin. The longer the tapered point or nose, the less longitudinal stress and the smoother the outward flare of the rivet shell. A pin of blunt bullet shape or short tapered nose either breaks the rivet head or knocks the blind end off the stem, with attendant distortion of the work being riveted.

The structure of the pin of the invention is essential to the type of work referred to just preceding. The fine point on the nose starts the metal at the end of the rivet shell outward for a flare and thus exerts little pressure on the rivet head during the initial phase of the impact and setting. Then as the nose section increases the ratio of outward flow of the blind end of the rivet, the stem has already been swelled into the material being riveted so that the greater longitudinal stress during the succeeding phase of setting is greatly absorbed to lessen the shock on the rivet head. If the total thrust were exerted on the rivet head alone, the head would be broken off; therefore, the swelling or expansion of the rivet body into the surrounding work must absorb most of the end thrust created in the process of flaring the blind end of the shell or stem.

The taper with the involute curve is much preferred as the shape of the nose section of the pin and is essential when the work being riveted is thin and unsupported.

The foregoing disclosure is not to be construed as unduly limiting the invention, but must be considered as illustrative of preferred embodiments thereof, except where necessary limitations are clearly placed thereon.

I claim:

1. In combination, a rivet comprising a metallic tubular circumferentially continuous stem having a head on one end and adapted to be inserted thru a hole in the work substantially the outer diameter of said stem, the main bore of said stem being of uniform diameter extending completely thru the head end and to near the opposite end and there converging inwardly to an expandable bore of substantially smaller diameter than said main bore; a metallic expanding and setting element for said rivet having a cylindrical body section at least as long as said main bore of uniform diameter substantially greater than said main bore to provide an expansion of said stem laterally and compression of the metal in the hole wall when set in said rivet, a pointed nose section of substantially conical contour pointed away from said body section having a base of a diameter substantially that of said main bore, and an intermediate transition section joining said body section to said nose section and having a portion rearward of said nose section of a diameter no larger than said base, said element when forced into said bore being adapted to expand the main bore of said rivet by means of said body section to cause said stem to bind in said hole and to expand said opposite end of said stem by means of said nose section to form a second head thereon on the inside of said work applying compression force between the heads of said rivet and provide a circumferentially continuous rivet in said work.

2. The combination of claim 1 wherein said intermediate portion of said transition section is of lesser diameter than said base.

3. The combination of claim 1 wherein said intermediate portion of said transition section is of lesser diameter than said base, the contour of said base and said intermediate section forms a reverse curve, said intermediate section joins said body section at a slope in the range of 25° to 45° and the apex angle of said nose section is in the range of 25° to 40°.

References Cited in the file of this patent

UNITED STATES PATENTS

| | | |
|---|---|---|
| 2,264,747 | Fether | Dec. 2, 1941 |
| 2,302,590 | Waite | Nov. 17, 1942 |
| 2,314,445 | Du Vall | Mar. 23, 1943 |
| 2,326,855 | Hathorn | Aug. 17, 1943 |
| 2,389,479 | Austin | Nov. 20, 1945 |
| 2,756,624 | Austin | July 31, 1956 |
| 3,009,384 | Degen et al. | Nov. 21, 1961 |
| 3,030,850 | Minor et al. | Apr. 24, 1962 |

FOREIGN PATENTS

| | | |
|---|---|---|
| 1,136,578 | France | Mar. 15, 1957 |